(12) United States Patent
Kravitz

(10) Patent No.: US 6,853,564 B2
(45) Date of Patent: Feb. 8, 2005

(54) SWITCHED LINEAR INDUCTOR CIRCUIT FOR SWITCHED POWER SUPPLY

(75) Inventor: David Kravitz, Remsenburg, NY (US)

(73) Assignee: Switching Power, Inc., Ronkonkoma, NY (US)

( * ) Notice: Subject to any disclaimer, the term of this patent is extended or adjusted under 35 U.S.C. 154(b) by 0 days.

(21) Appl. No.: 10/401,330

(22) Filed: Mar. 25, 2003

(65) Prior Publication Data

US 2004/0190313 A1 Sep. 30, 2004

(51) Int. Cl.⁷ ................................................. H02M 1/12
(52) U.S. Cl. ...................................................... 363/44
(58) Field of Search ............................. 363/39, 44, 45, 363/46, 47, 125

(56) References Cited

U.S. PATENT DOCUMENTS

| | | | |
|---|---|---|---|
| 3,590,362 A | * | 6/1971 | Kakalec ........................ 363/22 |
| 3,931,565 A | * | 1/1976 | Hase ........................... 363/139 |
| 4,553,199 A | * | 11/1985 | Harada et al. ................. 363/75 |
| 4,564,897 A | | 1/1986 | Okamoto et al. |
| 4,831,508 A | | 5/1989 | Hunter |
| 4,855,890 A | | 8/1989 | Kammiller |
| 4,982,148 A | | 1/1991 | Engelmann |
| 5,146,396 A | | 9/1992 | Eng et al. |
| 5,742,103 A | | 4/1998 | Ashok |
| 5,986,440 A | | 11/1999 | Deschenes et al. |
| 6,111,230 A | | 8/2000 | Cao et al. |
| 6,411,533 B2 | | 6/2002 | Hooijer et al. |
| 2002/0050829 A1 | | 5/2002 | Xu |

FOREIGN PATENT DOCUMENTS

| | | |
|---|---|---|
| EP | 1 229 633 A1 | 8/2002 |
| JP | 10-075565 | 3/1998 |

* cited by examiner

*Primary Examiner*—Adolf Berhane
(74) *Attorney, Agent, or Firm*—Scully, Scott, Murphy & Presser

(57) ABSTRACT

An alternate approach to meeting the harmonic current limits specified in EN61000-3-2 for power supplies, which fall under the classification of Class A equipment and also provide universal input voltages. In use, an electronic switch (triac) is used as the simple switch between low line input (90–132 VAC) and high line input(180–254 VAC) to provide an auto ranging front end. An inductor is placed in series with the input bridge diodes to increase the conduction angle of the input line current, thereby, increasing the power factor of the supply. This inductor is switched in series with the bulk capacitor whenever the triac is off. In this way, the harmonics are reduced at high line only, and the supply runs unaffected with low power factor at low line. Thus the harmonic currents are reduced at the test voltage of 230V without the need for an active power factor corrective front end.

10 Claims, 4 Drawing Sheets

SWITCHED LINEAR INDUCTOR CIRCUIT FOR SWITCHED POWER SUPPLY

FIELD OF THE INVENTION

The present invention relates to switching power supplies in general, and particularly, to a novel approach for meeting imposed limits on the current harmonics drawn from the main power supply for certain AC to DC switching power supplies. More particularly, the present invention relates to a novel approach for meeting imposed limits on the current harmonics drawn from the main power supply in accordance with the EN61000-3-2 International Electrotechnical Commission (IEC) standard for certain Class A type equipment.

BACKGROUND OF THE INVENTION

According to the EN61000-3-2 IEC standard, there are imposed limits for harmonic current emissions (equipment input currents 16 A per phase). In one common application, active power factor correction (PFC) is used to convert the quasi sinusoidal input current from the line (main power supply) to a more sinusoidal form. This increases the power factor of the supply and thus reduces the harmonic current emissions, allowing the supply to meet EN61000-3-2 for Class A equipment.

FIG. 1 depicts a prior art power supply circuit 10 implementing active power factor correction. As shown in FIG. 1, the AC line voltage 12 is full-wave rectified by rectifier circuit bridge 15 and a switching regulator 18 including switching components Q1 and D1 that are used to boost up this voltage, e.g., to 380V, regardless of the input. Thus, universal input is achieved and the input current is forced to be sinusoidal and in phase with the line voltage by U1 controller 20. This control chip may comprise a typical average current mode controller, e.g., such as provided by Texas Instruments and defined as part number UC3853, or UC 3854. As shown in FIG. 2, the active power factor correction according to the circuit configuration of FIG. 1 enables maximum power transfer as the alternating line current 25 (I line) and the a.c. line voltage 29 (Vac) are in phase. The boosted 380V may then be further switched to provide a regulated DC voltage, such as 5V, 3.3V, etc., employed for semiconductor integrated circuits. The circuitry depicted in FIG. 1, although effective in reducing harmonic currents, does have some drawbacks including: decreased reliability due to high component count and stress on switching components Q1 and D1; a reduction in the overall efficiency of the supply due to a typical efficiency of the boost regulator of no better than 95%; and, increased high frequency conducted and radiated emissions back on to the AC mains due to the high switching frequency of the boost regulator, which imposes an additional cost and imposition of providing more input EMI (electromagnetic interference) filtering to meet emission standards.

An approach typically taken to provide a universal input power supply without power factor correction is shown in FIG. 3 which depicts a switching power supply 30 including an electronic switch (such as a triac device 35) gated by a controller/drive device 37 that electronically configures the triac 35 (T1) to be ON or OFF based upon capacitor voltages (C1, C2). Particularly, the controller/drive device 37 may comprise a universal voltage monitor, e.g., the ON Semiconductor™ device part number MC34161, MC3 3161 which is enable direct monitoring of positive and negative voltages. This approach has the benefits of requiring only a few components to achieve universal input, also, the efficiency of the supply remains unaffected at high line (>180 VAC input) since triac T1 is OFF for this line range. In addition, the overall reliability of the supply is better than in the active power factor correction (PFC) front end of FIG. 1, due to the circuit's low part content and low stress count. Furthermore, in the embodiment of FIG. 3, the electromagnetic interference (EMI) problem is reduced due to the static nature of this topology. However, the switching power supply circuit 30 will not provide harmonic current reduction, and for power levels above 200 W will not provide compliance to EN61000-3-2. This is because the circuit will generate the same AC line current waveform as in the straight rectified capacitor front end without a triac. A diagram showing the line current for this case is shown in FIG. 4(a) which depicts the AC line current 36 provided with the triac switch T1 turned on as compared with the a.c. line voltage Vac 39. In this configuration, the duration of the Iac current flow peak 38 is about 2 milliseconds, however, as known, is dependent upon the magnitude of capacitors C1 and C2 and the load thereon and is dependent upon a crest value of the ac waveform.

It would be highly desirable to provide a switching mode power supply circuit utilizing having a simple auto ranging front end such as described above with respect to FIG. 3 that complies with the EN61000-3-2 standard.

It would be highly desirable to provide a switching mode power supply circuit having a simple auto ranging front end such as described above with respect to FIG. 3 that complies with the EN61000-3-2 standard and includes the addition of a switched passive element for ensuring harmonic current limiting at certain line level voltages.

SUMMARY OF THE INVENTION

It is thus an object of the present invention to provide a switching mode power supply circuit utilizing a simple auto ranging front end that complies with the EN61000-3-2 standard.

It is a further object of the present invention to provide a switching mode power supply circuit having a simple auto ranging front end that complies with the EN61000-3-2 standard and that includes the addition of a switched passive device for ensuring harmonic current limiting at certain line level voltages.

In the preferred embodiment, the switched passive device is a linear inductor device.

It is yet another object of the present invention to provide a switching mode power supply circuit having a supply efficiency at low line (90–132 VAC input) not lower than that of the auto ranging case.

It is still another object of the present invention to provide a switching mode power supply circuit having a reliability at low line (90–132 VAC input) not lower than that of the auto ranging case.

Briefly, according to the invention, the switching mode power supply circuit utilized to achieve both an auto ranging input and compliance with the EN6 1000-3-2 standard includes a linear inductor connected in series with the bridge diodes of a full-wave rectifying bridge and a triac used to provide universal input and also the switch mechanism for placing the inductor in series with the input bulk capacitor thus providing EN61000-3-2 compliance.

The inductor is adjusted to provide attenuation of the harmonic current that normally flows from the AC power line because of the rectifiers and capacitor DC filter in the power supply load. The value of this inductance is selected or adjusted to reduce the harmonics of the line current to less than the values of the EN6 1000-3-2 standard. This inductor will reduce the harmonic content of the AC line current by providing an LC filter for the AC mains, increasing the ON time of the input diodes.

According to the principles of the invention, there is provided a harmonic current limiter for an AC to low voltage DC power supply comprising a full wave bridge rectifier circuit and an filter capacitor for said power supply, the current limiter comprising:

a linear input inductor connected in series with a bridge diode of the full wave bridge rectifier circuit;

a means for switching the linear input inductor in series with the input filter capacitor in a manner such that current values at harmonic frequencies generated by the AC to DC power supply are reduced and power factor correction for the power supply is increased at high line voltage inputs without affecting the low line operation of the power supply. That is, the harmonic currents are not changed at low line, i.e., the inductor is not switched in series with the bulk capacitor so that the inductor does not affect the low line operation of the power supply and thus the inductor does not see the large line current which exists as low line.

Thus, advantageously, the power supply is not altered at low line, and exhibits no degradation of performance, i.e., loss of efficiency or loss of input line range, or stress on the linear inductor.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENT

Figure 5:
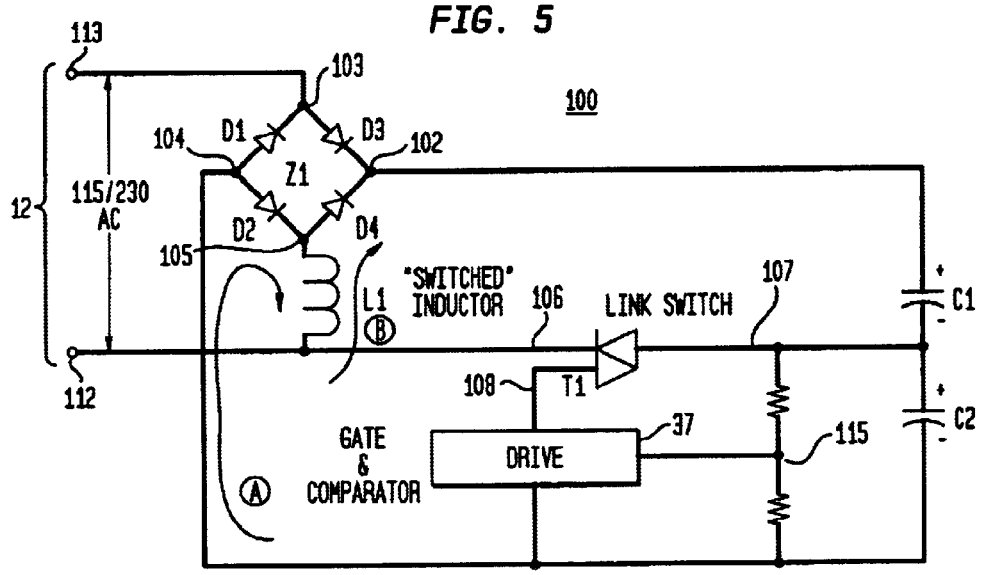
FIG. 5 is a schematic diagram of the preferred embodiment of the universal input provider and harmonic current reducer to allow the power supply to meet EN61000-3-2 limits.

FIG. 5 depicts a generic block diagram 100 of the harmonic current limiter circuit for an AC to low voltage DC power supply designed to be auto ranging and not changing the harmonic currents at low line according to the principles of the invention.

The circuit is comprised of a rectifier circuit Z1 comprising four diodes D1–D4 in a full-wave rectifying bridge configuration for accepting an alternating current (AC) voltage input 12 from a commercial power lines anywhere in the world, i.e., universal input, providing voltages ranging from about 90 Vac–264 Vac, with an input frequency range of 47–63 Hz, for example. Connected at the node 102 of the rectifying bridge Z1 are series connection of input bulk capacitors C1 and C2. In normal full-wave rectifier operation, assuming no link switch comprising a triac device T1, both diodes D2 and D3 conduct during the positive excursion of the AC voltage input 12 for charging capacitors C1 and C2 and, both diodes D1 and D4 conduct during the negative excursion of the AC voltage input 12 for charging capacitors C1 and C2 in the same direction.

However, according to the invention, in the circuit 100, a link switch, comprising triac device T1 having a first triac terminal 106 is connected to a return electrode 112 of the ac input mains, and, a second triac terminal 107 is shown connected to the node connecting input bulk capacitors C1 and C2. One terminal of the input bulk capacitor C2 opposite the node connected to triac terminal 107 is connected to node 104 of the rectifier bridge. A resistor divider network 115 is connected in parallel across the input bulk capacitor C2 to sense the voltage charge across capacitor C2 and provides the sensed voltage to a drive circuit 37 which controls the autoranging feature of the power supply and provides the gate signals 108 for driving the triac into or out of conduction (i.e., ON or OFF). Thus, in normal full-wave rectifier operation, assuming link switch (triac device) T1 is turned ON, only diode D3 conducts during the positive excursion of the AC voltage input 12 for charging capacitor C1, and, only diode D1 conducts during the negative excursion of the AC voltage input 12 for charging capacitors C2. In this configuration, with link switch (triac device) T1 turned ON and in conduction, a voltage doubling effect is achieved at the capacitors whereby the voltages on C1 and C2 are additive at low line inputs (e.g., 90–132 VAC).

Novel to the invention is the provision of a linear device comprising an inductor L1 that connects the common node 105 of rectifying diodes D2 and D4 to the triac terminal 106. In operation, as will be explained in greater detail, inductor device L1 is switched into and out of the circuit according to the conduction state of the link switch—triac T1.

For example, in operation, the positive rectified (voltage) excursion of the Vac is impressed across input bulk capacitors C1 and C2 via diode D3. As the voltage across capacitor C2 reaches a predetermined level, the triac device T1 is switched OFF. As a consequence, any AC line current that is high-line, e.g., greater than 180 V ac, is conducted through inductor L1 via rectifier diode D2 only when T1 is OFF. That is, it is observed that diode D2 conducts only whenever T1 is OFF and current flows through inductor L1 in the direction as shown by arrow "A" in FIG. 5. Likewise, for the negative excursion of the AC input 12, as the voltage across capacitor C2 reaches a predetermined level, approximately 180V, the triac device T1 is switched OFF and AC line current is conducted through inductor L1 and through rectifier diodes D4 only when T1 is OFF in the direction as shown by arrow "B" in FIG. 5.

As described herein, the controller/drive device 37 comprises a universal voltage monitor, such as ON Semiconductor™ device part number MC34161, MC33161, which enables direct monitoring of positive and negative voltages and includes additional circuitry that electronically configures the triac 35 (T1) to be ON or OFF based upon the line and consequently, the capacitor voltages (C1, C2) monitored. According to the invention, the voltage monitored by the gate and comparator circuit 37 is configured such as to turn ON/OFF the link switch T1, particularly, to turn ON T1 at 115 volt Vac input line and turn OFF T1 when receiving 230 Vac input. Thus, it is understood that for low-line voltages, i.e., 90 Vac–132 Vac, when the triac device T1 is switched ON, any low-line AC line currents, e.g., at 120 VAC, bypasses the inductor L1 by virtue of T1 being ON.

Figure 1:
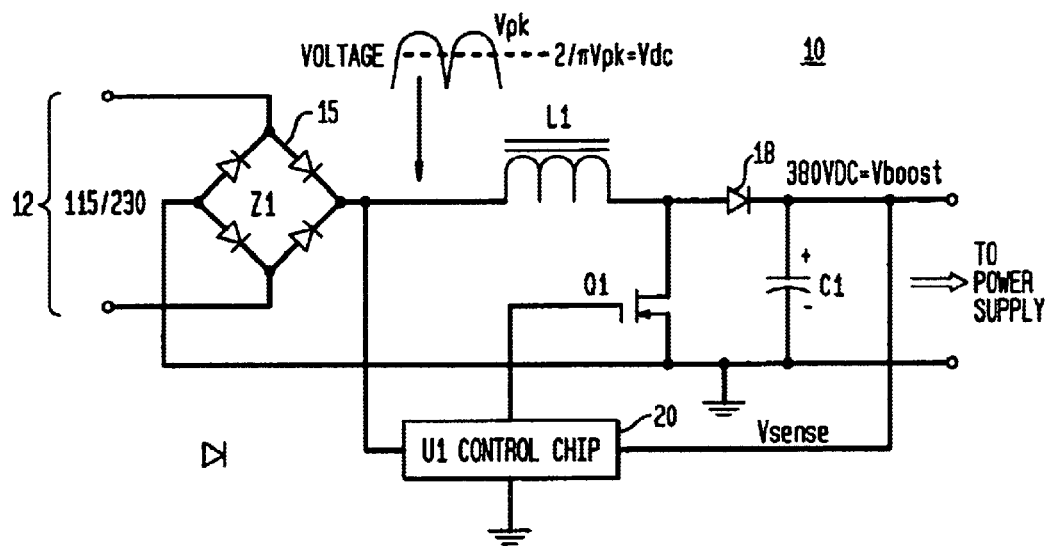
FIG. 1 is a schematic diagram of a typical active PFC front end of a power supply circuit 10.
Figure 2:
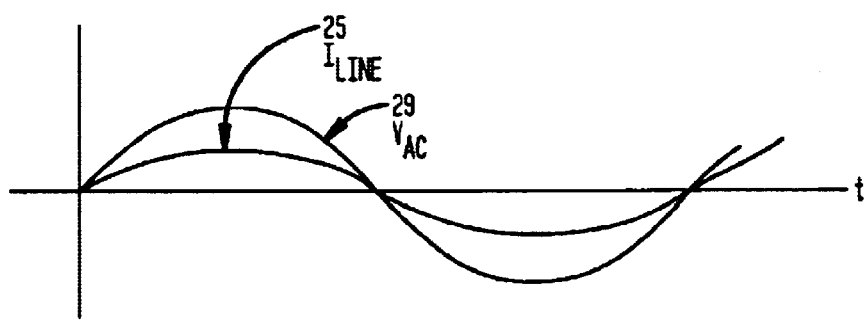
FIG. 2 is a waveform of the AC input voltage and AC input current of an active PFC front end.
Figure 3:
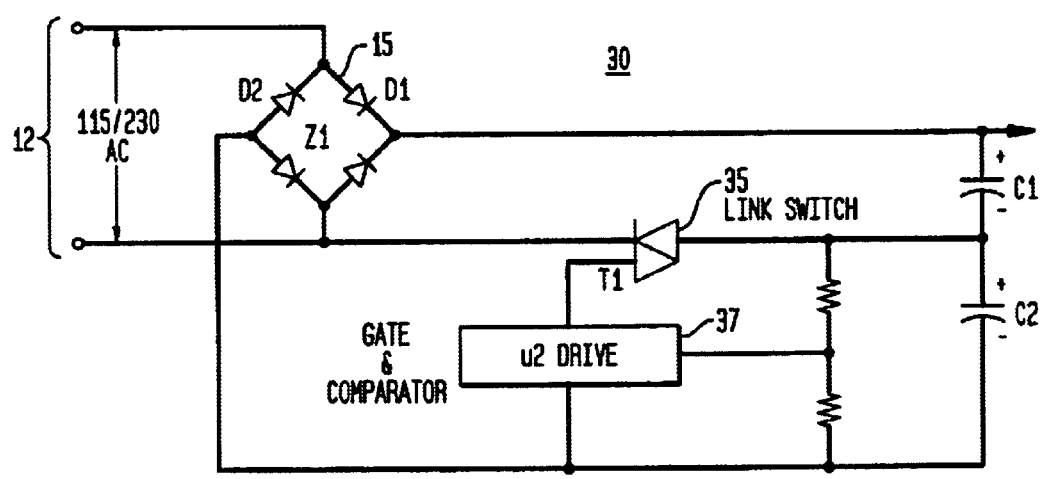
FIG. 3 is a schematic diagram of a typical universal input front end of a power supply circuit 30.

By way of example, for a 300 W power supply load, the relative harmonic currents with and without the presence of switched inductor L1 is compared. The improvement in the magnitude of the harmonic currents with the circuit of FIG. 5 compared to that of the conventional universal input front end of FIG. 3, is illustrated in Tables 1(a) and 1(b). It is further shown that the low line efficiency of the two circuits is the same. Furthermore, it is shown that the power factor improves as well with the presence of L1 at high line only.

In the preferred embodiment, referring to FIG. 5, the inductor L1 must remain linear through the full load input line current. The inductance of L1 is chosen to attenuate the harmonics of the AC line current at high line, e.g., 180 Vac to 264 Vac. These harmonics are attributable to the input diodes (D1–D4) and the capacitor filter of the power supply. By proper selection of the inductance L the harmonics are limited to under those specified in EN61000-3-2. As the output power of the supply is increased to 300 W the need for a linear inductance is paramount to meeting the specification limits. The value of inductance determines how much attenuation of the harmonic currents can be seen.

Noteworthy results were achieved using a standard universal input supply and modifying it to contain the inductor in the location shown in FIG. 5. The supply was rated 5 Volts at 60 Amps. Without the inclusion of the switched inductor L1 the following results are obtained as shown in Table 1(a):

TABLE 1(a)

| AC LINE VOLTAGE(V) | AC LINE CURRENT(A) | EFFICIENCY (%) | POWER FACTOR |
|---|---|---|---|
| 90.71 | 6.45 | 70.71 | 0.724 |
| 100.77 | 5.89 | 71.26 | 0.709 |
| 115.47 | 5.28 | 71.67 | 0.687 |
| 132.16 | 4.78 | 71.82 | 0.660 |
| 180.02 | 3.85 | 72.71 | 0.595 |
| 230.00 | 3.42 | 72.29 | 0.526 |
| 264.80 | 3.07 | 70.76 | 0.521 |

With the inclusion of the switched inductor L1 the following results are obtained as shown in Table 1 (b):

TABLE 1(b)

| AC LINE VOLTAGE(V) | AC LINE CURRENT(A) | EFFICIENCY (%) | POWER FACTOR |
|---|---|---|---|
| 90.67 | 6.40 | 70.77 | 0.728 |
| 100.77 | 5.85 | 71.33 | 0.710 |
| 115.72 | 5.29 | 71.68 | 0.684 |
| 132.13 | 4.76 | 71.70 | 0.664 |
| 180.81 | 3.23 | 71.30 | 0.719 |
| 230.90 | 2.64 | 71.60 | 0.686 |
| 264.10 | 2.39 | 70.58 | 0.673 |

Figure 4A:
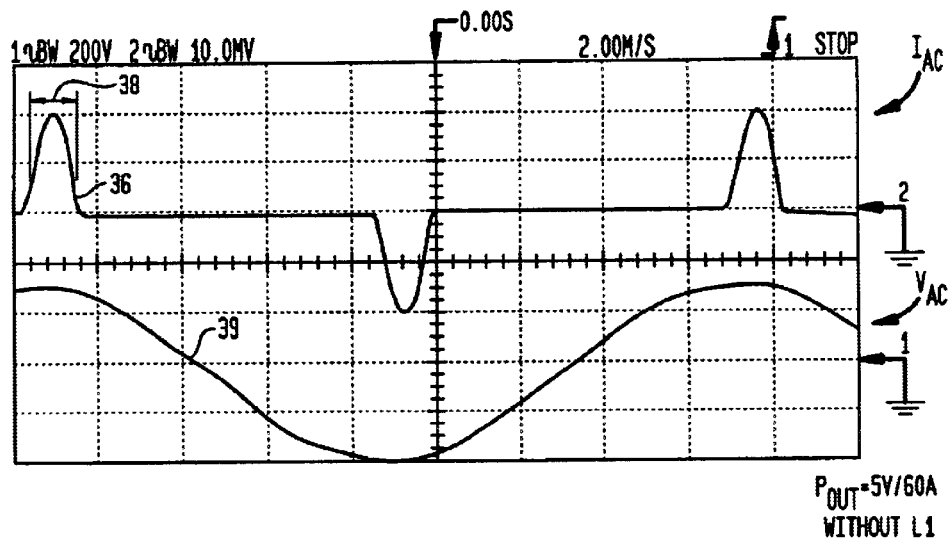
FIG. 4(a) is a waveform of the AC input voltage and AC input current for the universal input front end without a harmonic current reducer.
Figure 4B:
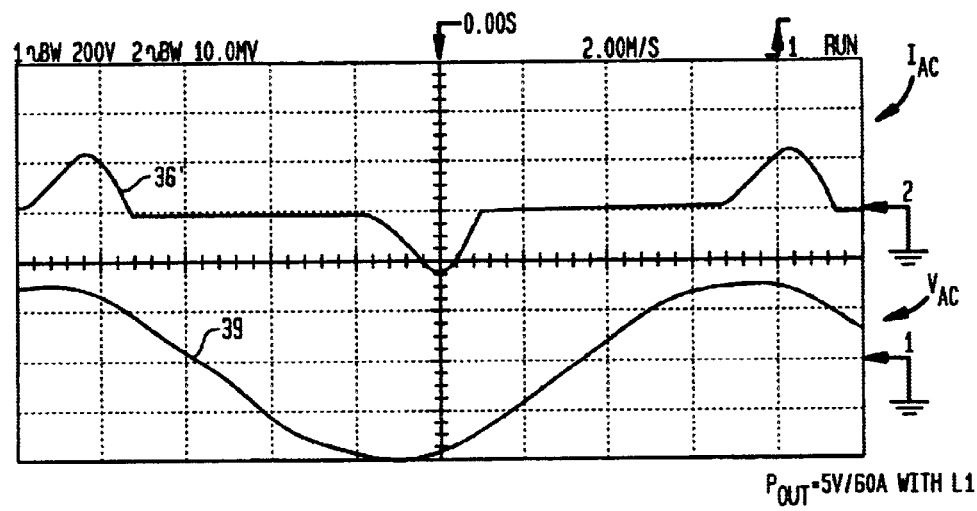
FIG. 4(b) is a waveform of the AC input voltage 39 and AC input current 36' for the universal input front end with the harmonic current reducer of FIG. 5.

FIG. 4(b) illustrates a waveform of the AC input voltage 39 and AC input current 36' for the universal input front end with the harmonic current reducer of FIG. 5. As shown, the Iac current waveform with L1 included is more sinusoidal, and exhibits a longer conduction time and lower peak current as compared with the similar results shown in FIG. 4(a), thus resulting in reduced harmonic current content and increased power factor correction at the high line input. The results indicated in Table 1(b) corroborate the improvement in power factor coupled with the advantage of harmonic current limiting provided for the example 300 W standard universal input supply modified according to the invention to include a switchable inductor.

Shown below in Table 2 are experimental values obtained including measured harmonic currents with and without the switched inductor L1 as compared with the maximum permissible harmonic currents per EN61000-3-2 standard. For Class A operation, a set of harmonic limits are specified as provided herein in Table 2 below which shows Class A limit values specified as absolute levels for all harmonics up to the $40^{th}$ harmonic.

TABLE 2

| Harmonic order(n) | Measured Current Without Inductor(L1)(Amps) | Measured Current With Inductor(L1)(Amps) | Measured permissible harmonic current A(per EN61000-3-2, limits for Class A equipment) |
|---|---|---|---|
| 2 | 0.0346 | 0.03350 | 1.08 |
| 3 | 1.7006 | 1.5098 | 2.30 |
| 4 | 0.006644 | 0.010361 | 0.43 |
| 5 | 1.5170 | 0.9983 | 1.14 |
| 6 | 0.007104 | 0.001802 | 0.30 |
| 7 | 1.2756 | 0.5007 | 0.77 |
| 8 | 0.008466 | 0.001445 | 0.23 |
| 9 | 0.9950 | 0.18857 | 0.40 |
| 10 | 0.005569 | — | 0.184 |
| 11 | 0.7117 | 0.10772 | 0.33 |
| 12 | 0.004995 | 0.000363 | 0.153 |
| 13 | 0.4523 | 0.07325 | 0.21 |
| 14 | 0.003169 | — | 0.131 |
| 15 | 0.2317 | 0.04077 | 0.150 |
| 16 | 0.003181 | — | 0.115 |
| 17 | 0.07261 | 0.04002 | 0.132 |
| 18 | 0.001598 | — | 0.102 |
| 19 | 0.05131 | 0.02921 | 0.118 |
| 20 | — | — | 0.092 |
| 21 | 0.09527 | 0.02112 | 0.107 |
| 22 | — | — | 0.083 |
| 23 | 0.10052 | 0.02227 | 0.098 |
| 24 | — | — | 0.076 |
| 25 | 0.07961 | 0.016593 | 0.090 |
| 26 | — | — | 0.070 |
| 27 | 0.04266 | 0.015068 | 0.083 |
| 28 | — | — | 0.065 |
| 29 | 0.007841 | 0.013382 | 0.077 |
| 30 | — | — | 0.061 |
| 31 | 0.016486 | 0.011157 | 0.072 |
| 32 | — | — | 0.057 |
| 33 | 0.03009 | 0.010399 | 0.068 |
| 34 | — | — | 0.054 |
| 35 | 0.03299 | 0.009353 | 0.064 |
| 36 | — | — | 0.051 |
| 37 | 0.02564 | 0.008295 | 0.060 |
| 38 | — | — | 0.048 |
| 39 | 0.012472 | 0.007425 | 0.057 |
| 40 | — | — | 0.046 |

It may thus be seen that the present invention allows the power supply to meet the harmonic current limits of EN61000-3-2 at high line without changing the performance of the supply at low line. It is also evident that the complexity of this circuit versus the active approach is significantly less and this new concept improves the reliability and efficiency of the supply over the active case.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An AC to DC power supply having an autoranging front end for receiving high-line and low-line AC voltage inputs, said AC to DC power supply comprising a full wave rectifier circuit for receiving AC voltage at first and second nodes thereof, a third node being coupled to an input capacitor filter including first and second capacitors at an output node, and a fourth node coupled to the series configuration of input capacitors at a return node, said power supply comprising:

- a switching device having a first and second terminal, a first terminal connected to a node common to said first and second capacitors, and a second terminal connected to a first ac line input, said switching device being in a conduction state at low line AC voltage input and being switched out of conduction for high line AC voltage inputs to provide said auto ranging front end;
- a linear inductor connected between a first node of said full wave rectifier circuit and said second terminal of said switching device,
- wherein said linear inductor is switched in series with the input capacitor filter at high line AC voltage inputs in order to reduce current values at harmonic frequencies generated by said AC to DC power supply and increase power factor for said power supply.

2. The AC to DC power supply having an autoranging front end as claimed in claim 1, further comprising:
a voltage sense means for sensing a voltage across one of said capacitors in said capacitor filter, and generating an output signal for controlling said switching device, whereby said output signal causes switching of said switching device from a conduction state to a non-conduction state when a sensed capacitor voltage corresponding to a high line AC voltage input is sensed.

3. The AC to DC power supply having an autoranging front end as claimed in claim 2, wherein said voltage sense means comprises a voltage divider network.

4. The AC to DC power supply having an autoranging front end as claimed in claim 2, wherein said low line input corresponds to voltage inputs ranging anywhere between 90–32 VAC and said high line input corresponds to voltage inputs ranging anywhere between 180–254 VAC.

5. The AC to DC power supply having an autoranging front end as claimed in claim 2, wherein said switched inductor remains linear for input line currents corresponding to high line voltage AC input.

6. The AC to DC power supply having an autoranging front end as claimed in claim 2, wherein said switching device comprises a triac device having a third control terminal for receiving said output signal of said voltage sense means.

7. A harmonic current limiter for an AC to low voltage DC power supply comprising a full wave bridge rectifier circuit and an filter capacitor for said power supply, said current limiter comprising:

- a linear input inductor connected in series with a bridge diode of said full wave bridge rectifier circuit;
- a means for switching said linear input inductor in series with the input filter capacitor in a manner such that current values at harmonic frequencies generated by said AC to DC power supply are reduced and power factor correction for said power supply is increased at high line voltage inputs without affecting the low line operation of the power supply.

8. The harmonic current limiter according to claim 7, wherein said switching means comprises a triac device for enabling autoranging front end for receiving high-line and low-line AC voltage inputs, said current limiter including a means for controlling conduction state of said triac device according to an input AC voltage input received.

9. The harmonic current limiter according to claim 8, wherein for high-line AC voltage input, said controlling means enables said lilac device to be non-conducting, thereby enabling said linear input inductor to be connected in series with a bridge diode of said full wave bridge rectifier circuit.

10. The harmonic current limiter according to claim 8, wherein for low-line AC voltage input, said controlling means enables said triac device to be conducting to thereby bypass said series connection of said linear input inductor and said bridge diode of said full wave bridge rectifier circuit, whereby said AC to low voltage DC power supply is not altered at low line voltage input.

* * * * *